United States Patent [19]

Ishibashi et al.

[11] Patent Number: 5,330,732
[45] Date of Patent: Jul. 19, 1994

[54] METHOD FOR PURIFYING EXHAUST GASES

[75] Inventors: Kazunobu Ishibashi, Toyota; Shinichi Matsumoto; Shiroh Kondoh, both of Aichi; Yasuhide Utsumi, Iwata, all of Japan

[73] Assignees: Toyota Jidosha Kabushiki Kaisha, Toyota; Kabushiki Kaisha Toyota Chuo Kenkyusho, Aichi; Cataler Industrial Co. Ltd., Shizuoka; Tosoh Corporation, Shinnanyo, all of Japan

[21] Appl. No.: 870,218

[22] Filed: Apr. 17, 1992

Related U.S. Application Data

[63] Continuation of Ser. No. 599,411, Oct. 18, 1990, abandoned.

[30] Foreign Application Priority Data

Oct. 18, 1989 [JP] Japan .................. 1-270678
Dec. 22, 1989 [JP] Japan .................. 1-333878

[51] Int. Cl.⁵ .............................. B01J 23/38
[52] U.S. Cl. ..................... 423/213.2; 423/213.5
[58] Field of Search ................. 423/213.2, 213.5

[56] References Cited

U.S. PATENT DOCUMENTS

| | | | |
|---|---|---|---|
| 3,983,021 | 9/1976 | Henis | 204/164 |
| 4,297,328 | 10/1981 | Ritscher et al. | 423/213.2 |
| 4,331,644 | 5/1982 | Ritscher | 423/437 |
| 4,572,904 | 2/1986 | Onal | 423/213.5 |
| 4,654,319 | 3/1987 | Kim et al. | 423/213.5 |
| 4,791,091 | 12/1988 | Bricker et al. | 502/303 |
| 4,929,581 | 5/1990 | Steinwandel et al. | 423/213.5 |
| 5,041,272 | 8/1991 | Tamura et al. | 423/239 |
| 5,223,236 | 6/1993 | Inoue et al. | 423/213.2 |

FOREIGN PATENT DOCUMENTS

| | | |
|---|---|---|
| 610628 | 3/1989 | Australia . |
| 20799 | 1/1981 | European Pat. Off. ......... 423/213.5 |
| 0020799 | 7/1981 | European Pat. Off. . |
| 0263399 | 4/1988 | European Pat. Off. . |
| 0291704 | 11/1988 | European Pat. Off. . |
| 0362966 | 4/1990 | European Pat. Off. . |
| 0369576 | 5/1990 | European Pat. Off. . |
| 0369085 | 11/1990 | European Pat. Off. . |
| 3805734 | 8/1989 | Fed. Rep. of Germany ... 423/213.2 |
| 60-125250 | 7/1985 | Japan . |
| 3007845 | 1/1988 | Japan ..................... 502/66 |
| 63-100919 | 5/1988 | Japan . |
| 63-283727 | 11/1988 | Japan . |
| 1135541 | 5/1989 | Japan . |
| 1310742 | 12/1989 | Japan ..................... 502/66 |

OTHER PUBLICATIONS

W. M. Meier et al., Atlas of Zeolite Structure Types (pp. 62, 148, 152), 1987.
E. S. Lox et al., "Diesel Emission Control", Catalysis and Automotive Pollution Control II (pp. 291–295), Sep. 1990.

Primary Examiner—Gary P. Straub
Assistant Examiner—Timothy C. Vanoy
Attorney, Agent, or Firm—Oblon, Spivak, McClelland, Maier & Neustadt

[57] ABSTRACT

A method for the catalytic purification of an oxygen-rich exhaust gas, wherein the catalyst comprises: a catalyst support, a zeolyte layer formed on the catalyst support and noble metals such as platinum, palladium and rhodium loaded on the catalyst. The catalyst for purifying the exhaust gas maintains a superior exhaust gas conversion performance over a long period of time.

19 Claims, 3 Drawing Sheets

METHOD FOR PURIFYING EXHAUST GASES

This application is a continuation of Ser. No. 07/599,411, filed on Oct. 18, 1990, now abandoned.

BACKGROUND OF THE INVENTION

1. Field of the Invention

The present invention relates to a catalytic method for purifying exhaust gases of an internal combustion engine. It particularly relates to such a catalyst employing a zeolite.

2. Description of the Related Art

A zeolite has pores whose sizes are almost equal to those of molecules, and is also known as a "molecular sieve". The zeolite has been utilized in many reactions as a catalyst as well as an absorbent. Further, the zeolite is also utilized as a cation exchanger, since the zeolite includes cations for neutralizing negative electric charges of $Al_2O_3$, and since the cations are easily exchanged with the other cations in an aqueous solution.

In recent years, it has been examined to apply the zeolite to a catalyst for purifying exhaust gases of automobiles in view of these characteristics of the zeolite.

For example, Japanese Unexamined Patent Publication (KOKAI) No. 97047/1985 discloses a catalyst for purifying exhaust gases in which copper is loaded into a zeolite by means of an ion exchange.

Further, Japanese Unexamined Patent Publication (KOKAI) No. 135541/1989 discloses a catalyst for purifying exhaust gases in which noble metals selected from the group consisting of platinum (Pt), palladium (Pd), rhodium (Rh), iridium (Ir) and ruthenium (Ru) are loaded into a zeolite by means of an ion exchange. In the catalyst for purifying exhaust gases, a catalyst support is coated with 100 g of the zeolite per 1 liter of the catalyst support, and 1.0 g of platinum or palladium and 0.2 g of rhodium per 1 liter of the catalyst support are loaded on the zeolite, as usual. Since the noble metals are expensive, the amounts thereof used as a catalyst metal are usually not so great.

These catalysts offer an improved conversion performance on nitrogen oxides even under a lean atmosphere where oxygen exists in an excess amount. Accordingly, it is possible to dilute the concentration of the air-fuel mixture supplied into an engine, thereby enabling to sufficiently purify harmful components over a wide range from the theoretical air-fuel ratio to the lean atmosphere side. Therefore, it is possible to achieve a higher mileage with a less fuel consumption.

However, in the above-mentioned catalyst in which the zeolite contains copper as positive ions, it has been found that the copper is aggregated by the heat generated during the service as a catalyst, and that the catalyst performance deteriorates because the copper is unstable at a high temperature of 800° C. or more.

Further, in the above-mentioned catalyst in which the zeolite contains the noble metals as cation, it has been found that the catalyst performance deteriorates after a durability test.

SUMMARY OF THE INVENTION

The present invention has been developed in view of the aforesaid circumstances. It is therefore an object of the present invention to prevent the catalyst performance of a zeolitic catalyst from being deteriorated by heat.

After a through research and development, the inventors of the present invention discovered that the durability in the high temperature range is improved remarkably by loading at least one of platinum (Pt), palladium (Pd) and rhodium (Rh) into a zeolite by a predetermined amount or more, respectively. The inventors have thus completed the present invention.

The catalyst for purifying exhaust gases of the present invention includes a catalyst support, a zeolite layer adhered to and formed on the catalyst support, and at least one noble metal selected from the group consisting of platinum, palladium and rhodium loaded into the zeolite layer, wherein the selected noble metal is loaded on the zeolite layer by a predetermined amount or more. When platinum is selected as a noble metal, 1.3 parts by weight or more thereof is loaded on 100 parts by weight of the zeolite layer. When palladium is selected as a noble metal, 0.8 parts by weight or more thereof is loaded on 100 parts by weight of the zeolite layer. When rhodium is selected as a noble metal, 0.7 parts by weight or more thereof is loaded on 100 parts by weight of the zeolite layer.

A conventionally known catalyst support such as a pelletted-shaped catalyst support, a monolithic catalyst support, a metal catalyst support and the like may be used as the catalyst support for the catalyst according to the present invention, and the material qualities of the catalyst supports are not specified herein in particular. In addition, the catalyst support may be made of a zeolite.

The zeolite layer comprising a zeolite is formed on the catalyst support. The zeolite forming the zeolite layer is crystalline aluminosilicate, and it is well known to be expressed by a general chemical formula as follows: $xM_{2/n} \cdot Al_2O_3 \cdot ySiO_2$. The diameter of pore in the crystal structure depends on the M (n-valent metal) and the values of x and y. For instance, the following are available and may be employed: analcimes, sodalites, A type zeolites, faujasites, natrolites, mordenites, heulandites, and ZSM-5 and the like as well as synthetic zeolites whose structures have been unknown yet. Especially, it is preferred to use a zeolite having pores whose diameters are approximately from 5 to 10 Å. Such diamters are slightly bigger than the molecular sizes of nitrogen oxides. Further, as for the $SiO_2/Al_2O_3$ molar ratio, it is preferred to fall in the range of from 10 to 200.

One of the major features of the present invention is that at least one of the noble metals is loaded on the zeolite layer by the predetermined amounts or more. The inventors of the present invention produced many kinds of zeolitic catalyst in which the loading amounts of the each of the platinum, palladium and rhodium are changed variously, and examined the catalyst performances before and after a high temperature durability test. As a result, as shown in FIGS. 1 to 6, the conversions of nitrogen oxides increase in accordance with the increase in the loading amounts of the noble metals in the initial stage of the catalyst operation. However, after the high temperature durability test, it is found that the conversions of nitrogen oxides increase sharply at inflection points corresponding to the special loading amounts of the respective noble metals. Namely, it is found that the conversions of nitrogen oxides after the high temperature durability test have been improved remarkably by respectively loading 1.3 parts by weight or more of platinum, 0.8 parts by weight or more of palladium, or 0.7 parts by weight or more of rhodium into 100 parts by weight of the zeolite layer.

Further, it is disadvantageous in the cost performance to use the expensive noble metals in a greater amount though the catalyst performances before and after the high temperature durability test can be improved as the loading amounts of the noble metals increase. Therefore, the loading amounts of the noble metals depend on the balance of the cost performance and the aiming catalyst performances. Accordingly, the upper limits of the loading amounts of the noble metals are not specified herein in particular.

The catalyst for purifying exhaust gases of the present invention may be produced as follows. Firstly, a solution containing at least one of the noble metal ions is brought into contact with a zeolite, thereby loading at least one of the noble metals on the zeolite by an ion exchange and by an immersion. A slurry is made from the zeolite containing at least one of the noble metals. Then, a catalyst support is wash-coated with the slurry, and thereafter the thus wash-coated catalyst support is calcined, thereby forming the zeolite layer into which at least one of the noble metals are loaded. The catalyst for purifying exhaust gases of the present invention is obtained in this way. Or, as an alternative way, the catalyst support may be wash-coated with a zeolite, thereby forming a zeolite layer thereon and a solution containing at least one of the noble metals may be brought into contact with the catalyst support thus covered with the zeolite layer in order to load at least one of the noble metals into the zeolite layer by an ion exchange and by an immersion.

The catalyst for purifying exhaust gases of the present invention has the zeolite. The zeolite layer has pores of the order of angstroms which are almost equal to the sizes of molecules, and is also known as a "molecular sieve". Accordingly, nitrogen oxides are selectively taken into the pores. Since there exist the active sites of the noble metals loaded on the pores, the nitrogen oxides are absorbed on the active sites of the noble metals, thereby being reacted and purified.

Further, in the catalyst for purifying exhaust gases of the present invention, 1.3 parts by weight or more of platinum when platinum is selected as a noble metal, 0.8 parts by weight or more of palladium when palladium is selected as a noble metal, or 0.7 parts by weight or more of rhodium when rhodium is selected as a noble metal is respectively loaded into the zeolite layer taken as 100 parts by weight. Therefore, the durability of the catalyst is improved remarkably at high temperatures of 800° C. or more. The reason why the high temperature durability is improved has not be clarified yet. However, it is assumed that a greater number of the noble metals are taken into the effective active sites or into the active sites of high thermal stability by loading the predetermined amounts or more of the noble metals on the zeolite layer.

According to the catalyst for purifying exhaust gases of the present invention, it is possible to maintain the high conversion performance for a long period of time, since the deterioration of the catalyst performance due to the heat during the service has been prevented.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS OF THE INVENTION

Figure 1:
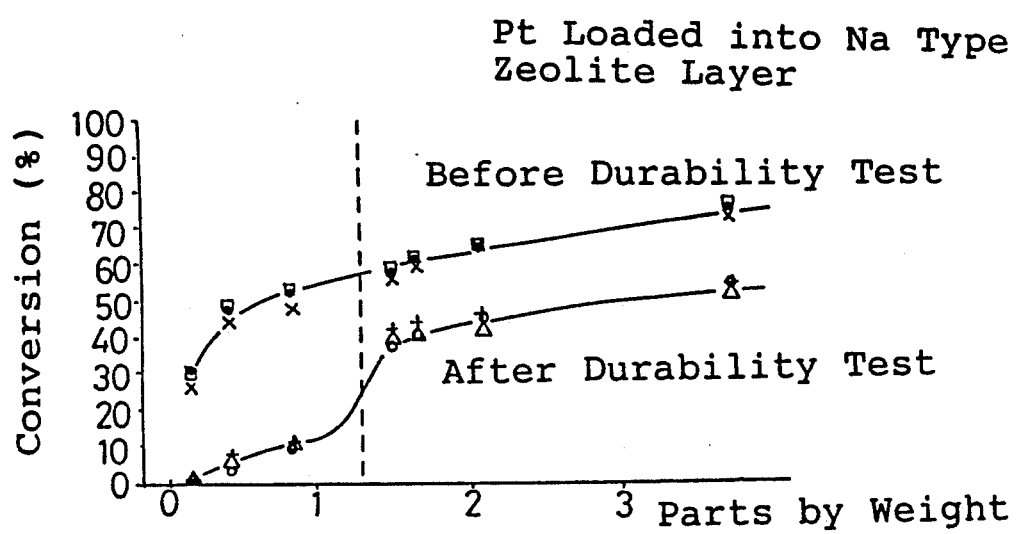
FIG. 1 is a graph showing relationships between loading amounts of platinum and conversions of nitrogen oxides.

Having generally described the present invention, a further understanding can be obtained by reference to certain specific preferred embodiments and comparative examples. The preferred embodiments are provided herein for purpose of illustration only and are not intended to be limiting unless otherwise specified.

Hereinafter the word "parts" shall mean the parts by weight. As the zeolite, three kinds of zeolites, namely the ZSM-5, the mordenite and the Y type zeolite were chosen. Further, two cation types for the three kinds of zeolites, namely the H- and Na- zeolites thereof were used respectively.

A hundred (100) parts of zeolite, 70 parts of silica sol (20 % by weight of $SiO_2$) and 80 parts of pure water were mixed and stirred in order to make a slurry. Meanwhile, a honeycomb catalyst support made of cordierite having a length of 50 mm and a diameter of 30 mm was immersed into pure water, and the catalyst support was blowed in order to remove the excessive water. Thereafter, the catalyst support was immersed into the slurry, and the catalyst support was blowed to remove the excessive slurry. Then, the catalyst support was dried at 100° C. for 3 hours, and calcined at 300° C. for 1.5 hours. After the operations described above were carried out repeatedly twice, the catalyst support was further calcined at 500° C. for 3 hours to form a zeolite layer thereon. This zeolite layer was formed by 120±5 g with respect to 1 liter of the honeycomb catalyst support.

Next, the noble metals were loaded on the honeycomb catalyst support having the above-mentioned zeolite layer. Here, a quadrivalent platinum ammine solution, a palladium ammine solution and a rhodium ammine solution were used in order to load the respective noble metals on the Na-zeolites layers. Further, a quadrivalent platinum ammine solution, a palladium acetate solution and rhodium nitrate solution were used in order to load the respective noble metals into the H-zeolites layers. The respective honeycomb catalyst supports were immersed into the respective solutions for 24 hours, and taken out of the respective solutions. After the catalyst supports were blowed in order to removed the excessive solutions, the honeycomb catalyst supports were calcined at 250° C. for 1 hour thereby obtaining the catalysts for purifying exhaust gases of the present invention. The catalysts thus obtained were analyzed by an atomic absorption analysis, and the loading amounts of the noble metals with respect to 1 liter of the honeycomb catalyst support and the loading amounts of the noble metals with respect to 100 parts by weight of the zeolite layer are set forth in Tables 1 to 6.

Table 1

| Zeolites | Noble Metals | Loading Amount g/l | Parts by Weight | NO Conversion (%) B.D. | A.D. |
|---|---|---|---|---|---|
| Na-ZSM-5 | Pt | 1.73 | 1.44 | 58 | 41 |
|  |  | 1.98 | 1.65 | 61 | 43 |
|  |  | 2.49 | 2.08 | 65 | 45 |
|  |  | 4.32 | 3.60 | 76 | 54 |
|  |  | 0.18 | 0.15 | 29 | 0 |
|  |  | 0.49 | 0.41 | 48 | 7 |
|  |  | 0.94 | 0.78 | 52 | 10 |
|  | Cu | 7.10 | 5.91 | 80 | 38 |
| Na-mordenite | Pt | 1.73 | 1.44 | 57 | 39 |
|  |  | 1.98 | 1.65 | 61 | 40 |
|  |  | 2.49 | 2.08 | 64 | 41 |
|  |  | 4.32 | 3.60 | 74 | 53 |
|  |  | 0.18 | 0.15 | 30 | 0 |
|  |  | 0.49 | 0.41 | 47 | 6 |
|  |  | 0.94 | 0.48 | 51 | 10 |
|  | Cu | 3.60 | 3.00 | 75 | 34 |
| Na-Y type zeolite | Pt | 1.72 | 1.43 | 55 | 35 |
|  |  | 1.89 | 1.58 | 59 | 40 |
|  |  | 2.44 | 2.03 | 65 | 44 |
|  |  | 4.31 | 3.59 | 72 | 50 |
|  |  | 0.17 | 0.14 | 25 | 0 |
|  |  | 0.49 | 0.41 | 43 | 2 |
|  |  | 0.99 | 0.83 | 47 | 8 |
|  | Cu | 3.30 | 2.75 | 70 | 30 |

Note: "B.D." ... Before Durability Test
"A.D." ... After Durability Test

Table 2

| Zeolites | Noble Metals | Loading Amount g/l | Parts by Weight | NO Conversion (%) B.D. | A.D. |
|---|---|---|---|---|---|
| Na-ZSM-5 | Pd | 0.99 | 0.83 | 53 | 41 |
|  |  | 1.49 | 1.24 | 58 | 43 |
|  |  | 1.97 | 1.64 | 64 | 46 |
|  |  | 3.88 | 3.23 | 68 | 47 |
|  |  | 0.18 | 0.15 | 20 | 0 |
|  |  | 0.37 | 0.31 | 39 | 0 |
|  |  | 0.67 | 0.56 | 48 | 5 |
| Na-mordenite | Pd | 0.97 | 0.81 | 51 | 39 |
|  |  | 1.47 | 1.23 | 57 | 41 |
|  |  | 1.95 | 1.63 | 65 | 42 |
|  |  | 3.85 | 3.21 | 69 | 45 |
|  |  | 0.17 | 0.14 | 22 | 0 |
|  |  | 0.37 | 0.31 | 35 | 2 |
|  |  | 0.64 | 0.53 | 49 | 7 |
| Na-Y type zeolite | Pd | 0.95 | 0.79 | 50 | 33 |
|  |  | 1.38 | 1.15 | 53 | 35 |
|  |  | 1.91 | 1.59 | 60 | 40 |
|  |  | 3.73 | 3.11 | 65 | 42 |
|  |  | 0.16 | 0.13 | 21 | 0 |
|  |  | 0.37 | 0.31 | 33 | 3 |
|  |  | 0.64 | 0.53 | 48 | 10 |

Note: "B.D." ... Before Durability Test
"A.D." ... After Durability Test

Table 3

| Zeolites | Noble Metals | Loading Amount g/l | Parts by Weight | NO Conversion (%) B.D. | A.D. |
|---|---|---|---|---|---|
| Na-ZSM-5 | Rh | 0.94 | 0.78 | 56 | 41 |
|  |  | 1.41 | 1.18 | 63 | 43 |
|  |  | 1.92 | 1.60 | 65 | 47 |

Table 3-continued

| Zeolites | Noble Metals | Loading Amount g/l | Parts by Weight | NO Conversion (%) B.D. | A.D. |
|---|---|---|---|---|---|
|  |  | 3.81 | 3.18 | 70 | 50 |
|  |  | 0.18 | 0.15 | 29 | 0 |
|  |  | 0.37 | 0.31 | 44 | 5 |
|  |  | 0.66 | 0.55 | 50 | 9 |
|  | Cu | 6.40 | 5.33 | 80 | 39 |
| Na-mordenite | Rh | 0.93 | 0.78 | 56 | 37 |
|  |  | 1.41 | 1.18 | 62 | 41 |
|  |  | 1.88 | 1.57 | 65 | 45 |
|  |  | 3.90 | 3.25 | 69 | 48 |
|  |  | 0.19 | 0.16 | 27 | 0 |
|  |  | 0.36 | 0.30 | 42 | 2 |
|  |  | 0.65 | 0.54 | 49 | 9 |
| Na-Y type zeolite | Rh | 0.95 | 0.79 | 54 | 32 |
|  |  | 1.48 | 1.23 | 60 | 35 |
|  |  | 1.92 | 1.60 | 63 | 38 |
|  |  | 3.76 | 3.13 | 67 | 41 |
|  |  | 0.16 | 0.13 | 21 | 0 |
|  |  | 0.37 | 0.31 | 35 | 0 |
|  |  | 0.64 | 0.53 | 43 | 5 |

Note: "B.D." ... Before Durability Test
"A.D." ... After Durability Test

Table 4

| Zeolites | Noble Metals | Loading Amount g/l | Parts by Weight | NO Conversion (%) B.D. | A.D. |
|---|---|---|---|---|---|
| H-ZSM-5 | Pt | 1.72 | 1.43 | 57 | 43 |
|  |  | 1.97 | 1.64 | 61 | 45 |
|  |  | 2.44 | 2.03 | 66 | 48 |
|  |  | 4.35 | 3.63 | 77 | 58 |
|  |  | 0.19 | 0.16 | 25 | 0 |
|  |  | 0.47 | 0.39 | 46 | 8 |
|  |  | 0.96 | 0.80 | 53 | 10 |
|  | Cu | 3.60 | 3.00 | 79 | 40 |
| H-mordenite | Pt | 1.70 | 1.42 | 55 | 40 |
|  |  | 1.89 | 1.58 | 57 | 43 |
|  |  | 2.43 | 2.03 | 64 | 46 |
|  |  | 4.31 | 3.59 | 74 | 54 |
|  |  | 0.17 | 0.14 | 23 | 0 |
|  |  | 0.44 | 0.37 | 45 | 4 |
|  |  | 0.95 | 0.79 | 50 | 7 |
|  | Cu | 3.30 | 2.75 | 75 | 35 |
| H-Y type Zeolite | Pt | 1.71 | 1.43 | 55 | 37 |
|  |  | 1.87 | 1.56 | 56 | 40 |
|  |  | 2.44 | 2.03 | 65 | 45 |
|  |  | 4.30 | 3.58 | 72 | 52 |
|  |  | 0.18 | 0.15 | 19 | 0 |
|  |  | 0.47 | 0.39 | 40 | 2 |
|  |  | 0.92 | 0.77 | 47 | 6 |
|  | Cu | 3.10 | 2.58 | 72 | 33 |

Note: "B.D." ... Before Durability Test
"A.D." ... After Durability Test

Table 5

| Zeolites | Noble Metals | Loading Amount g/l | Parts by Weight | NO Conversion (%) B.D. | A.D. |
|---|---|---|---|---|---|
| H-ZSM-5 | Pd | 0.94 | 0.78 | 54 | 39 |
|  |  | 1.42 | 1.18 | 59 | 41 |
|  |  | 1.91 | 1.59 | 62 | 45 |
|  |  | 3.85 | 3.21 | 73 | 54 |
|  |  | 0.18 | 0.15 | 24 | 0 |
|  |  | 0.33 | 0.28 | 38 | 4 |
|  |  | 0.68 | 0.57 | 47 | 9 |
| H-mordenite | Pd | 0.92 | 0.77 | 52 | 38 |
|  |  | 1.43 | 1.19 | 57 | 42 |
|  |  | 1.88 | 1.57 | 61 | 46 |
|  |  | 3.77 | 3.14 | 74 | 50 |
|  |  | 0.17 | 0.14 | 23 | 0 |
|  |  | 0.34 | 0.28 | 35 | 3 |

Table 5-continued

| Zeolites | Noble Metals | Loading Amount g/l | Parts by Weight | NO Conversion (%) B.D. | A.D. |
|---|---|---|---|---|---|
|  |  | 0.62 | 0.52 | 44 | 10 |
| H-Y type zeolite | Pd | 0.90 | 0.75 | 54 | 37 |
|  |  | 1.41 | 1.18 | 57 | 43 |
|  |  | 1.90 | 1.58 | 60 | 44 |
|  |  | 3.76 | 3.13 | 70 | 48 |
|  |  | 0.16 | 0.13 | 20 | 0 |
|  |  | 0.34 | 0.28 | 34 | 0 |
|  |  | 0.68 | 0.57 | 43 | 8 |

Note: "B.D." ... Before Durability Test
"A.D." ... After Durability Test

Table 6

| Zeolites | Noble Metals | Loading Amount g/l | Parts by Weight | NO Conversion (%) B.D. | A.D. |
|---|---|---|---|---|---|
| H-ZSM-5 | Rh | 0.96 | 0.80 | 55 | 41 |
|  |  | 1.47 | 1.23 | 58 | 44 |
|  |  | 1.95 | 1.63 | 63 | 47 |
|  |  | 3.79 | 3.16 | 75 | 56 |
|  |  | 0.18 | 0.15 | 27 | 0 |
|  |  | 0.37 | 0.31 | 46 | 7 |
|  |  | 0.66 | 0.55 | 51 | 10 |
| H-mordenite | Rh | 0.97 | 0.81 | 53 | 40 |
|  |  | 1.43 | 1.19 | 55 | 42 |
|  |  | 1.91 | 1.59 | 61 | 46 |
|  |  | 3.86 | 3.22 | 72 | 53 |
|  |  | 0.17 | 0.14 | 24 | 0 |
|  |  | 0.37 | 0.31 | 35 | 0 |
|  |  | 0.64 | 0.53 | 47 | 7 |
| H-Y type zeolite | Rh | 0.95 | 0.79 | 54 | 36 |
|  |  | 1.48 | 1.23 | 54 | 39 |
|  |  | 1.91 | 1.59 | 63 | 43 |
|  |  | 3.87 | 3.23 | 70 | 49 |
|  |  | 0.16 | 0.13 | 20 | 0 |
|  |  | 0.34 | 0.28 | 32 | 0 |
|  |  | 0.65 | 0.54 | 44 | 5 |

Note: "B.D." ... Before Durability Test
"A.D." ... After Durability Test

Or the catalysts thus obtained, the maximum conversions of nitrogen oxides during the initial stage of the service were measured under the following conditions:

Air-fuel ratio (A/F) ; 22

Inlet gas temperature; increased from 120° to 450° C.

Further, in order to examine the catalyst performance after the high temperature durability test, the catalysts were exposed an exhaust gas environment of an inlet gas temperature of 800 ° C., and the maximum conversions of nitrogen oxides were measured similarly under the following conditions, and the exhaust gas environment comprised a model gas ($O_2=4.3\%$) having an air-fuel ratio (A/F) equivalent to 18:

Air-fuel ratio (A/F) ; 22

Inlet gas temperature; increased from 120 ° to 450 C.

The results of the evaluation were set forth in Tables 1 through 6.

In comparison, honeycomb catalyst supports having several zeolite layers were immersed into a solution containing copper ions, and then the copper was loaded on the honeycomb catalysts having the zeolite layers in the same manner as aforementioned, thereby preparing comparative catalysts. The catalyst performances of the comparative catalysts were evaluated similarly, and the results of the evaluation were set forth in some of the tables, namely Tables 1, 3 and 4.

EVALUATION

Figure 2:
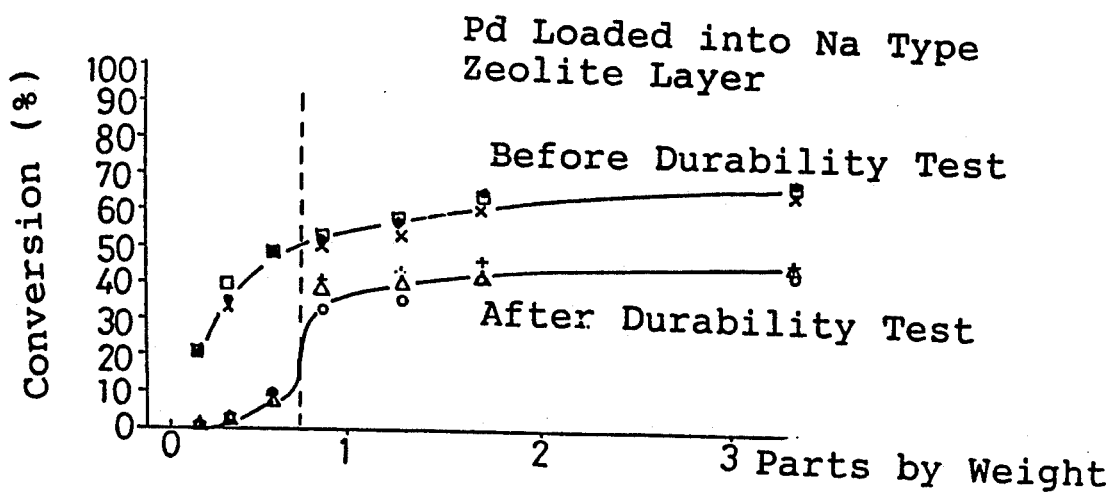
FIG. 2 is a graph showing relationships between loading amounts of palladium and conversions of nitrogen oxides.
Figure 3:
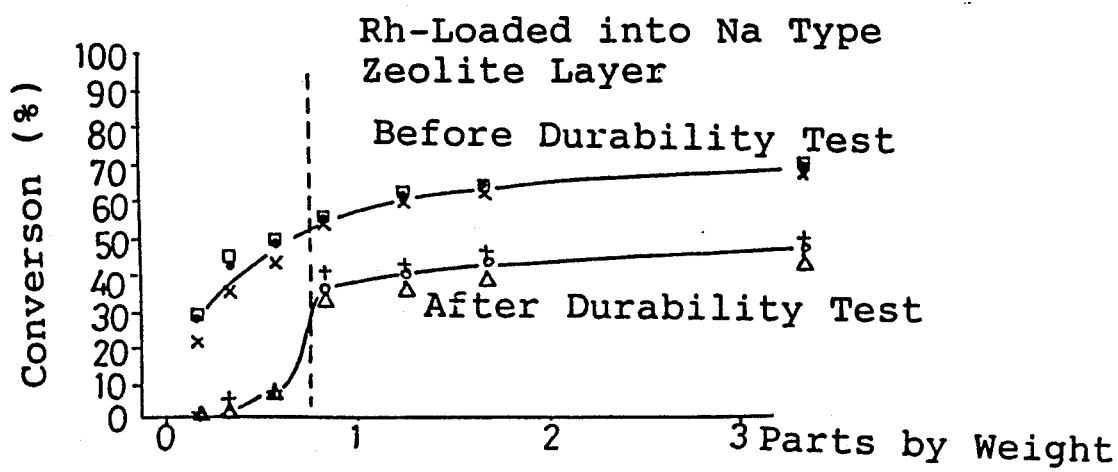
FIG. 3 is a graph showing relationship between loading amounts of rhodium and conversions of nitrogen oxides.
Figure 4:
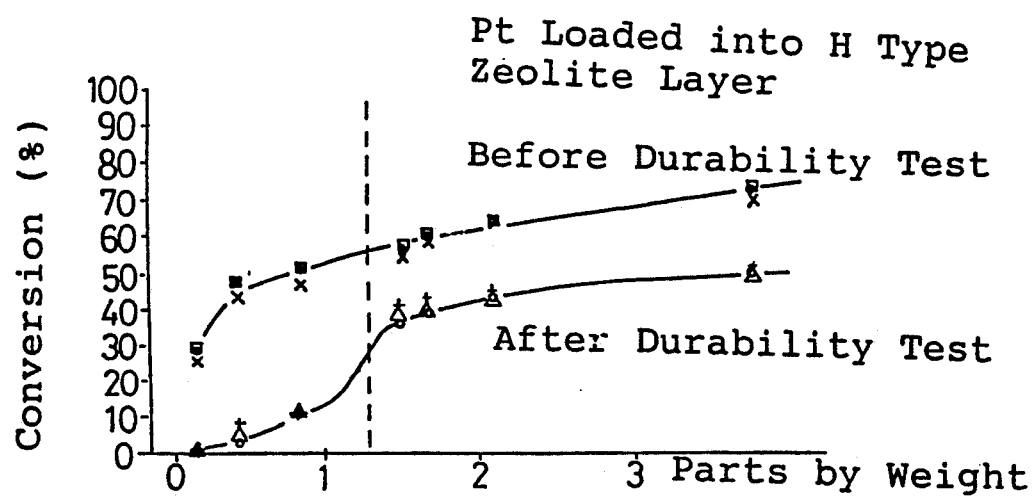
FIG. 4 is a graph showing relationships between loading amounts of platinum and conversions of nitrogen oxides.
Figure 5:
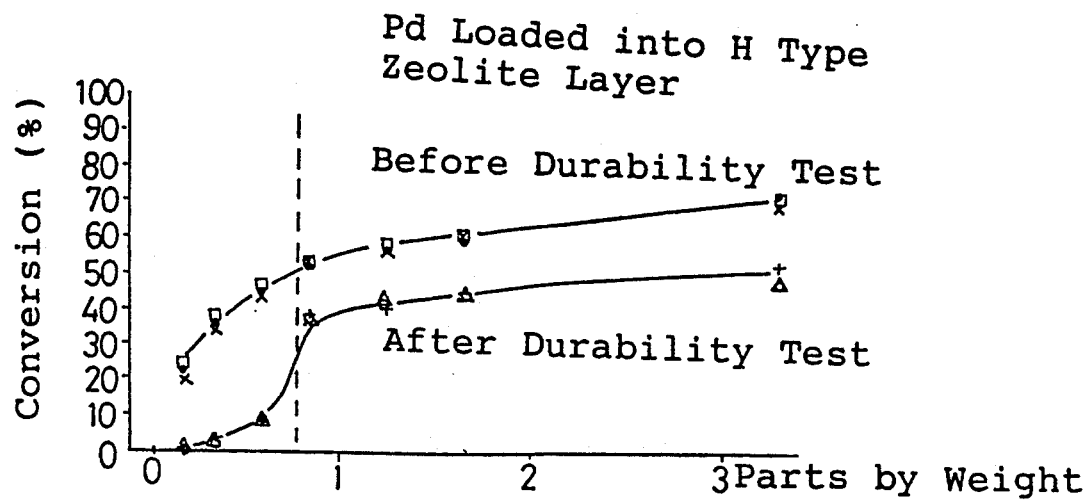
FIG. 5 is a graph showing relationships between loading amounts of palladium and conversions of nitrogen oxides.
Figure 6:
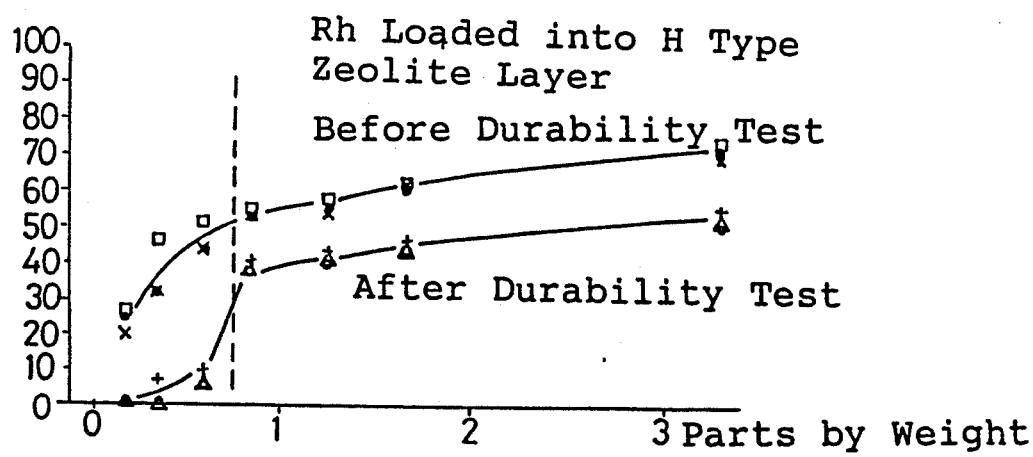
FIG. 6 is a graph showing relationships between loading amounts of rhodium and conversions of nitrogen oxides.

The results of the measurements set forth in Tables 1 to 6 are graphed in FIGS. 1 to 6. As shown in FIGS. 1 to 6, the conversions of nitrogen oxides increased in accordance with the increase in the loading amounts of the noble metals in the initial stage of the catalyst operation. However, after the high temperature durability test, the conversions of nitrogen oxides increased sharply at the inflection points corresponding to the respective loading amounts of the respective noble metals. Namely, the conversions of nitrogen oxides were improved remarkably at the platinum loading amounts 1.3 parts by weight or more, at the palladium loading amount of 0.8 parts by weight or more, and at the rhodium loading amounts of 0.7 parts by weight or more with respect to 100 parts by weight of the zeolite layer. This suggests that another factors other than the loading amounts influenced on the improvements in the conversions of nitrogen oxides.

Further, in the comparative catalysts into which copper is loaded, there were a large differences in conversions before and after the durability test, and accordingly the comparative catalysts were lacking in the durability. Though the nitrogen oxides conversions of the comparative catalysts was higher than those of the catalysts of the present invention in the initial stage of the catalyst service, the conversions of the catalysts of the present invention are higher than those of the comparative catalysts after the durability test. Therefore, the catalysts of the present invention is superior to the comparative catalyst in the practical application.

Having now fully described the present invention, it will be apparent to one of ordinary skill in the art that many changes and modifications can De made thereto without departing from the spirit or scope of the present invention as set forth herein.

What is claimed is:

1. A process for purifying an oxygen rich exhaust gas from an internal combustion engine operating at an air fuel ratio of 18 or more comprising the steps of:
   providing a catalyst consisting essentially of:
      a catalyst support;
      a layer formed on said catalyst support and including zeolite wherein said zeolite is a zeolite selected from the group consisting of analcimes, sodalites, zeolite A, natrolites, mordenites, heulandites, ZSM-5, and a mixture thereof; and
      platinum loaded on said layer by 1.3 parts by weight or more with respect to 100 parts of weight of said layer;
      a second step of contacting said catalyst with said oxygen rich exhaust gases containing nitrogen oxides, thereby reducing by catalytic reduction said nitrogen oxides;
      wherein said second step is conducted at a temperature of 120°–450° C.

2. The exhaust gas purifying process according to claim 1, wherein said zeolite has pores whose diameter fall in a range of 5 to 10 Å.

3. The exhaust gas purifying process according to claim 1, wherein a $SiO_2/Al_2O_3$ molar ratio of the $SiO_2$ and $Al_2O_3$ which are components of said Zeolite falls in a range of from 10 to 200.

4. The exhaust gas purifying process according to claim 1, wherein
   said catalyst support is one selected from the group consisting of a pellet-shaped catalyst support, a monolithic catalyst support and a metal catalyst support.

5. The exhaust gas purifying process according to claim 1, wherein
said catalyst support is made of zeolite other than "Y"-type zeolite.

6. The exhaust gas purifying process according to claim 1, wherein
said zeolite is at least one selected from the group consisting of ZSM-5 and mordenite.

7. A process for purifying an oxygen rich exhaust gas from an internal combustion engine operating at an air fuel ratio of 18 or more comprising the steps of:
providing a catalyst consisting essentially of:
a catalyst support;
a layer formed on said catalyst support and including zeolite wherein said zeolite is a zeolite selected from the group consisting of analcimes, sodalites, zeolite A, natrolites, mordenites, heulandites, ZSM-5, and a mixture thereof; and
palladium loaded on said layer by 0.8 parts by weight or more with respect to 100 parts of weight of said layer;
a second step of contacting said catalyst with said oxygen rich exhaust gases containing nitrogen oxides, thereby reducing by catalytic reduction said nitrogen oxides;
wherein said second step is conducted at a temperature of 120°–450° C.

8. The exhaust gas purifying process according to claim 7, wherein
said zeolite has pores whose diameters fall in a range of 5 to 10 Å.

9. The exhaust gas purifying process according to claim 7, wherein a $SiO_2/Al_2O_3$ molar ratio of the $SiO_2$ and $Al_2O_3$ which are components of said Zeolite falls in a range of from 10 to 200.

10. The exhaust gas purifying process according to claim 7, wherein
said catalyst support is one selected from the group consisting of a pellet-shaped catalyst support, a monolithic catalyst support and a metal catalyst support.

11. The exhaust gas purifying process according to claim 7 wherein
said catalyst support is made of zeolite other than "Y"-type zeolite.

12. The exhaust gas purifying process according to claim 7, wherein
said zeolite is at least one selected from the group consisting of ZSM-5 and mordenite.

13. A process for purifying an oxygen rich exhaust gas from an internal combustion engine operating at an air fuel ratio of 18 or more comprising the steps of:
providing a catalyst consisting essentially of:
a catalyst support;
a layer formed on said catalyst support and including zeolite wherein said zeolite is a zeolite selected from the group consisting of analcimes, sodalites, zeolite A, natrolites, mordenites, heulandites, ZSM-5, and a mixture thereof; and
rhodium loaded on said layer by 0.7 parts by weight or more with respect to 100 parts of weight of said layer;
a second step of contacting said catalyst with said oxygen rich exhaust gases containing nitrogen oxides, thereby reducing by catalytic reduction said nitrogen oxides;
wherein said second step is conducted at a temperature of 120°–450° C.

14. The exhaust gas purifying process according to claim 13, wherein
said zeolite has pores whose diameters fall in a range of 5 to 10 Å.

15. The exhaust gas purifying process according to claim 13, wherein
a $SiO_2/Al_2O_3$ molar ratio of the $SiO_2$ and $Al_2O_3$ which are components of said Zeolite falls in a range of from 10 to 200.

16. The exhaust gas purifying process according to claim 13, wherein
said catalyst support is one selected from the group consisting of a pellet-shaped catalyst support, a monolithic catalyst support and a metal catalyst support.

17. The exhaust gas purifying process according to claim 13, wherein
said catalyst support is made of zeolite other than "Y"-type zeolite.

18. The exhaust gas purifying process according to claim 13, wherein
said zeolite is at least one selected from the group consisting of ZSM-5 and mordenite.

19. A process for purifying an oxygen rich exhaust gas from an internal combustion engine operating at an air fuel ratio of 18 or more comprising the steps of:
providing a catalyst consisting essentially of:
a catalyst support;
a layer formed on said catalyst support and including zeolite wherein said zeolite is a zeolite selected from the group consisting of analcimes, sodalites, zeolite A, natrolites, mordenites, heulandites, ZSM-5, and a mixture thereof; and
at least one noble metal loaded on said layer and selected from the group consisting of platinum, palladium, and rhodium wherein said platinum, said palladium and said rhodium are loaded on said layer by 1.3 parts by weight or more, by 0.8 parts by weight or more, and by 0.7 parts by weight or more with respect to 100 parts of weight of said layer respectively;
a second step of contacting said catalyst with said oxygen rich exhaust gases containing nitrogen oxides, thereby reducing by catalytic reduction said nitrogen oxides;
wherein said second step is conducted at a temperature of 120°–450° C.

* * * * *